July 2, 1963     O. E. BAUER     3,095,858
VEHICLE MOUNTED ANIMAL CATCHING DEVICE
Filed June 14, 1961     3 Sheets-Sheet 1

Inventor
Oscar E. Bauer
By Mann, Brown & McWilliams
Attorneys

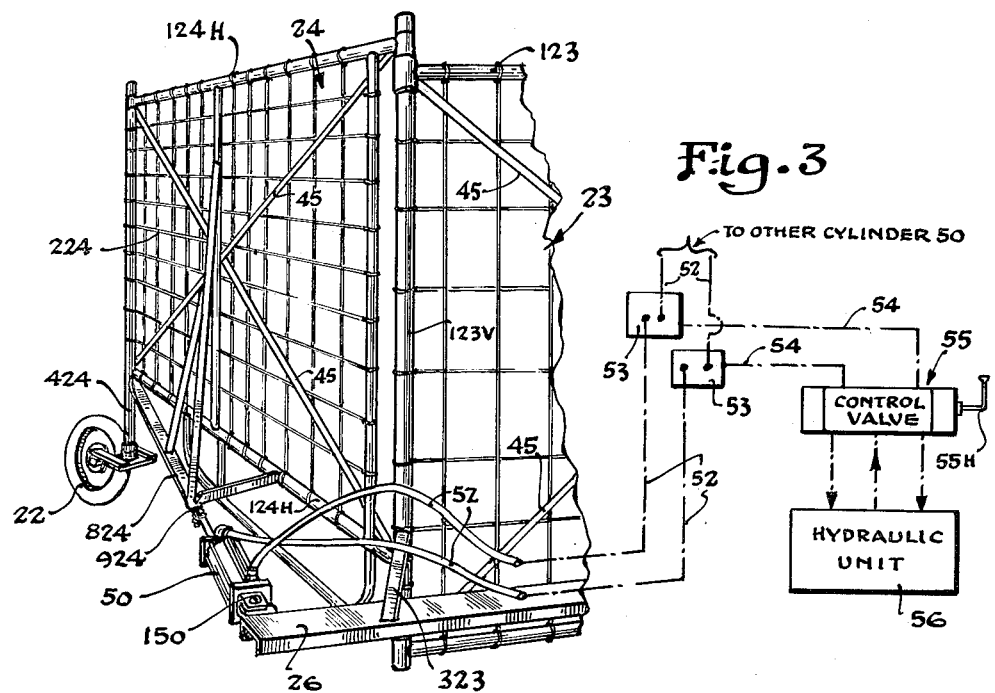
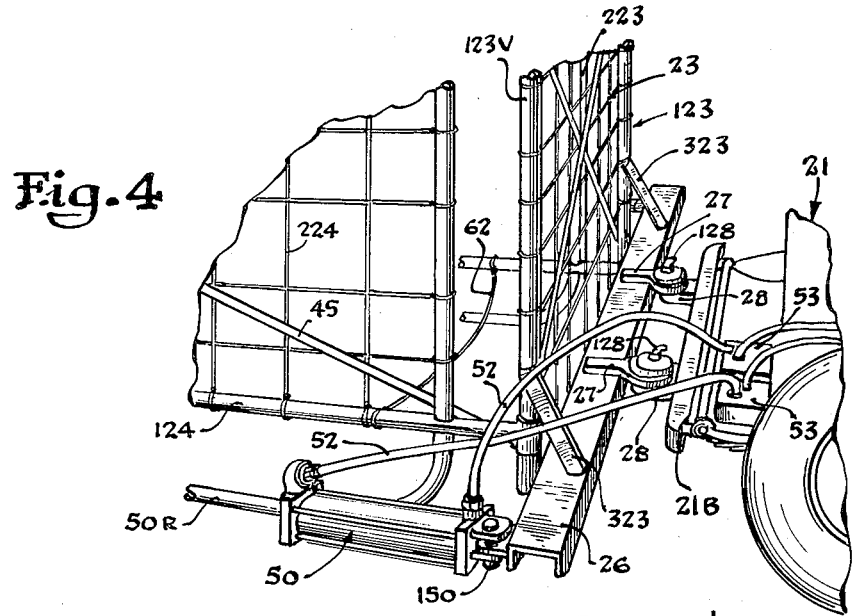

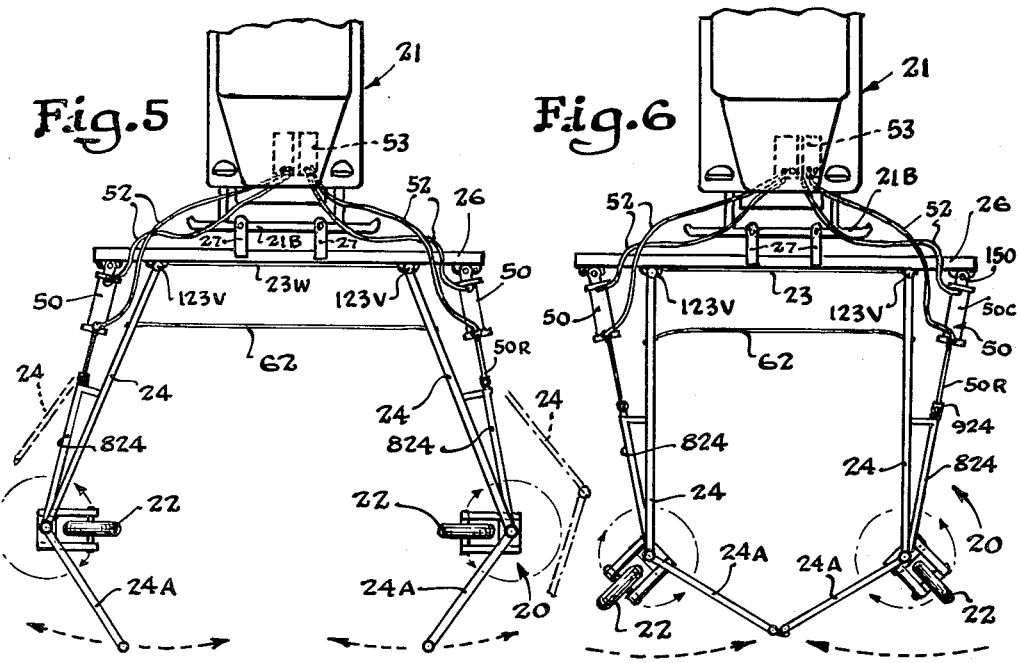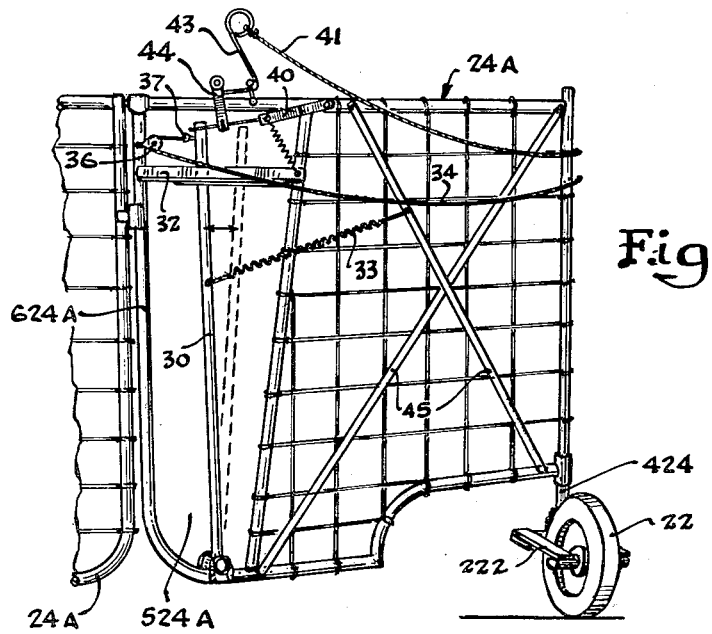

United States Patent Office 3,095,858
Patented July 2, 1963

3,095,858
VEHICLE MOUNTED ANIMAL CATCHING
DEVICE
Oscar E. Bauer, Long Lake Rte., Alliance, Nebr.
Filed June 14, 1961, Ser. No. 117,056
3 Claims. (Cl. 119—151)

This invention relates to means for pursuing and catching animals such as cows and sheep in fields or on open range where an automotive vehicle may be operated, and particularly the invention relates to a device of this character that is adapted for association with and operation by conventional automotive vehicles of the type used on farms, ranches and the like.

Ordinarily where animals are allowed to run in fields or open ranges, the matter of selecting and catching a particular animal for examination or other purposes has required the use of horses to either rope the animal or to drive the animal into a permanent pen. This necessity for use of horses in accomplishing the foregoing has in recent years been considered to be objectionable and the primary object of the present invention is therefore to enable animals to be caught through the use of means carried and movable with an automotive vehicle such as a car or tractor. More specifically, it is an object of this invention to provide an attachment in the nature of a pen to be associated with an automotive vehicle so as to move along ahead of the vehicle and having means for opening and closing the forward side of the pen so that as the automotive vehicle moves forwardly, the pen may be moved into surrounding relationship with respect to the animal and then may be closed by control means operable from within the body of the automotive vehicle.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 3 is a fragmentary rear perspective view of the device shown in schematic association with the hydraulic actuating and cotnrol means;

FIG. 4 is a fragmentary perspective view showing the manner of association of the animal catching device with a vehicle;

FIGS. 5 and 6 are fragmentary plan views showing the animal catching device in its partially open and closed positions, respectively; and FIG. 7 is a fragmentary front view of the device showing the stanchion and its operating and control means.

Figure 1:
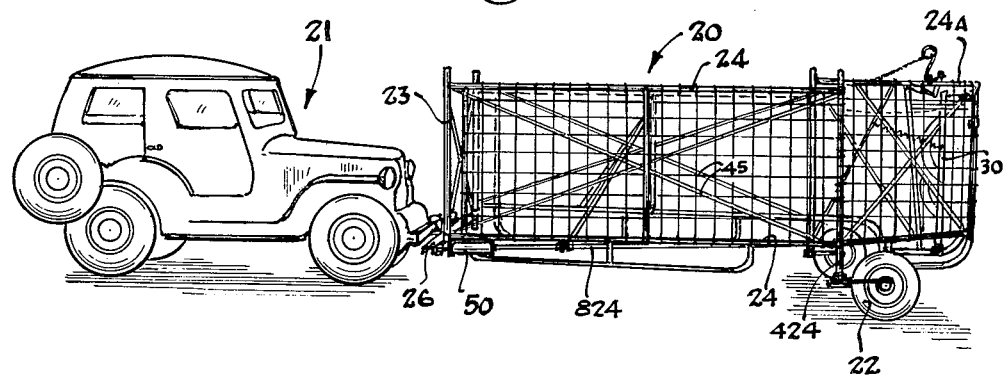
FIG. 1 is a side perspective view of an animal catching device embodying the features of the invention and associated with a vehicle.

For purposes of disclosure the invention is herein illustrated as embodied in an animal catching device 20 that is adapted to be removably placed in position at the forward end of the automotive vehicle 21 so that as the vehicle 21 is moved forwardly, the pen 20 will move with and be guided by the vehicle 21. The pen 21 is supported at its rear portion on the vehicle 21 as will be hereinafter described, while at its forward end it is supported by relatively large caster wheels 22, and means are provided whereby the parts of the pen 20 may be moved to or beyond the open relationship shown in FIG. 5, or may be moved to the closed relationship shown in FIG. 6, these opening and closing movements of the pen 20 being accomplished by hydraulic means that are controlled from within the vehicle 21, as will be described.

The pen 20 has its vertical walls formed in several sections that are fence-like in character, and such walls may be identified as a rear wall 23, side walls 24 and rigid angular extensions 24A that are provided on and as part of the side walls 24 at the forward edges thereof.

The rear wall 23 is made up of a pipe-like frame 123 having wire fence material 223 stretched thereacross, this fence material preferably being of relatively large mesh. The frame 123 has its vertical members 123V secured as by brackets 323 to a rigid transverse mounting bar 26 which extends beyond the vertical frame members 123V of the rear wall 23, as will be evident in FIGS. 3 to 6. The brackets 323 are rigidly joined to the vertical members 123V of the rear wall and to the mounting member 26 as by welding so that the vertical wall 23 is supported slightly forwardly of the frame member 26. The cross frame 26 has a pair of downwardly facing socket members 27 fixed thereto to serve as part of a hitch or mounting structure whereby the pen may be removably mounted with respect to the vehicle 21. Thus the vehicle 21 has a forward bumper structure 21B as shown in FIGS. 1, 4, 5 and 6, and permanent mounting brackets 28 are mounted on the vehicle so that the downwardly facing sockets 27 may be put in place over upstanding portions of the brackets 28. The parts may be held in position as by fastening members 128 which may take many different forms, and it is to be pointed out that one essential characteristic provided by the members 27 and 28 is that the pen 20 be capable of at least limited movement of a pivotal character about a horizontal axis parallel to the bumper 21B.

The side walls 24 of the pen are also provided by pipe-like frames 124 that are covered by wire fencing material 224, and the upper and lower horizontal members 124H of the frames 124 are pivoted on vertical axes on the vertical post members 123V of the frame 123 of the rear wall so that the side walls 24 may be swung outwardly and inwardly between open and closed positions as mentioned hereinabove. The particular way in which this movement is accomplished will be described hereinafter.

At the forward ends of the side walls 124, the vertical member of the frame 123 is extended downwardly as at 424, and the caster wheels 22 are mounted thereon by means of plates 122 that are rotatably related to the lower ends of the extensions 424 so that a caster wheel action may be attained. The plates 122 have horizontally extending fork structures provided by leaf springs 222 that are each rigid at one end with the plate 122 and which at the other ends are connected to the wheel bearings of the wheels 22.

The forward extensions 24A are provided by frames 124A covered by wire fence material 224A, the horizontal members of the extensions 124 being rigidly connected to the vertical posts at the forward ends of the side walls 24. The extensions 24A converge forwardly toward each other as shown in FIG. 6.

Figure 2:
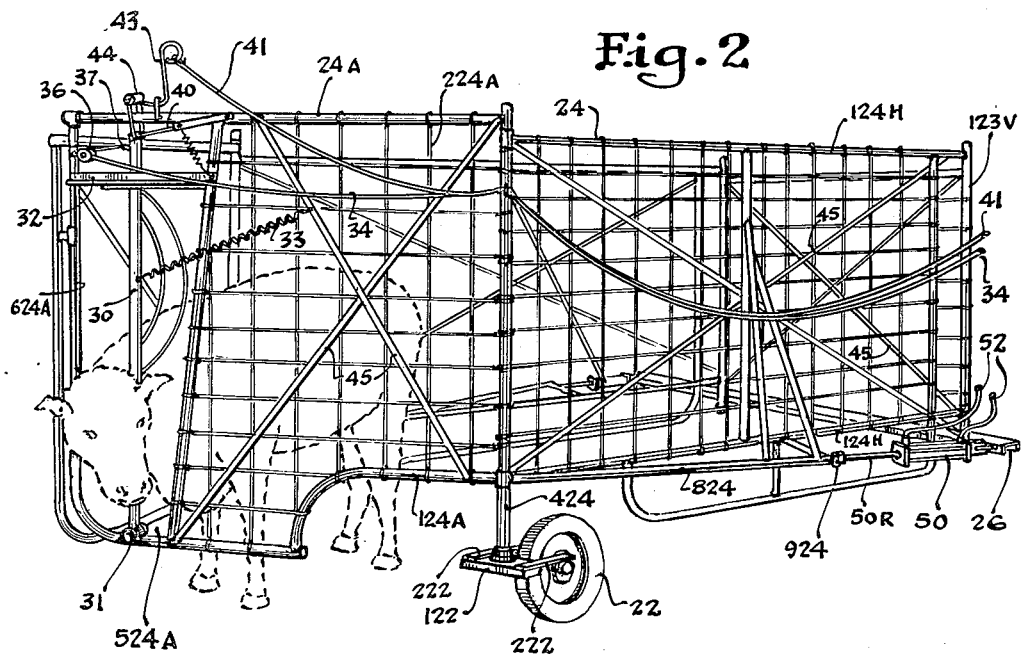
FIG. 2 is a front perspective view of the animal catching device.

One of the extensions 124 has a relatively open vertical space 524A formed therein at the extreme end as will be evident in FIG. 2, and within this space a stanchion structure is provided. Thus the vertical frame member 624A at the extreme end of the extension 24A provides one side of a stanchion and within the opening 524A, a stanchion bar 30 is located. The stanchion bar 30 is pivoted at its lower end at 31, and near its upper end it rides between a pair of guide bars 32 so as to be maintained in the plane of the opening 524 A. A spring 33 normally urges the stanchion bar 30 to an open position, and when the stanchion is to be closed the bar 30 is pivoted to the closed position shown in FIG. 2 by means of an operating rope 34 that extends rearwardly in the vehicle 21. This rope is suitably supported, and is guided along the wall of the pen and extends through a pulley 36 and is connected to the upper end portion of the bar 30 at 37. When the stanchion bar 30 is pulled to its closed position, a latch 40 falls into position, as shown in FIGS. 2 and 7 so as to hold the stanchion closed. This latch member 40 may be released from the operator's position by means of a rope 41 that is connected to a bell crank 43 that is pivoted on the upper member of the frame 124A. The bell crank 43 has an arm that is connected with a release bail 44 so that the release bail is moved upwardly by operation of the bell crank 43 to release the latch 40, thus to allow the stanchion bar 30 to be moved to its open position by the spring 43.

Several pipe-like frames that make up the pen are preferably provided with cross bracing 45 to provide rigidity so that the pen will withstand the rough usage to which it is subjected when the apparatus is moved rapidly over uneven ground.

As hereinbefore pointed out, the side walls 24 of the pen may be shifted between open and closed positions, and this is accomplished by hydraulic means that includes double acting piston and cylinder devices 50 connected between the cross frame 26 and the respective side walls 24. To facilitate such connection, each of the side walls has an outwardly projecting frame 824 that is in a rigid braced relation with respect to the side wall on which it is mounted, and such frame 824 provides a vertical pivot 924 for operative association with the related piston and cylinder unit 50. Thus each piston and cylinder unit 50 has cylinder 50C that is pivoted on a vertical axis 150 near the related end of the cross frame 26, and the unit 50 also has a piston rod 50R extended from its forward end, and the forward end of the piston rod 50R is connected to the pivot 924. Thus the operation of the piston and cylinder units 50 is effective to swing the side walls 24 between their open and closed positions, as will be evident in FIGS. 5 and 6 of the drawings.

The piston and cylinder units 50 have hoses 52 connected thereto and extended from opposite ends thereof to permanent connector fittings 53 that are mounted on the vehicle 21 adjacent to the bumper 21B. The connector units 53 in turn have individual connections 54 to a manual control valve 55, as diagrammatically illustrated in FIG. 3, the control valve 55 being located in the vehicle 21 adjacent the driver's position. The control valve 55 is in turn associated in a conventional manner with a hydraulic supply unit 56 so that by operation of a control handle 55H, the valve 55 may be set to move the side walls 24 of the pen to either open or closed positions as desired. This may of course be accomplished while the vehicle 21 and the pen 20 are in motion, it being noted that the caster wheels 22 conform in their position to the forward motion of the vehicle as well as to any lateral movements that may be applied to the side walls of the pen. As the pen 20 is moved forwardly it is of course desirable, when an animal is enclosed in the pen, to make sure that the animal will move forwardly at a corresponding speed and will not be struck by the rear wall 23 of the pen. This result may be assured by the provision of a transverse resilient member 62 in the form of an extensible spring, this transverse member 62 being extended between the side walls 24 somewhat forwardly of the rear wall 23. Best results of this transverse resilient member 26 apparently are attained by mounting the spring relatively close to the ground where it will strike the lower portions of the legs of an animal.

With the structure that has thus been described, the user may associate the pen structure with the automotive vehicle relatively easily, and in most instances, in less than five minutes. The connections of the hydraulic hoses 52 must of course be established to the connector fitting 53 in a conventional manner, and the elements 27 and 28 of the coupling must be associated one with the other. The pen 20 is of course relatively light and the necessary work is thus very slight.

After the pen has been associated with the vehicle, the vehicle may be driven into the field, and with the side walls 24 of the pen 20 in an open relation, which may be considerably beyond the position shown in FIG. 5, the operator may approach an animal at either low or high speed, and when the pen 20 has been moved into partially surrounding relation with respect to the animal the side walls of the pen may be actuated to the closed position of FIG. 6. When this is accomplished it is found that the animal tends to walk away from the vehicle and toward the converging forward end of the pen 20 and to extend its head through the opening 524A, thus to put its head within the space that may be closed by the stanchion bar 30. This closing of the stanchion may be accomplished by operation of the rope 34. The operator may then partially open the pen if desired and may get out and examine the animal while the animal is firmly held in the stanchion. Then, after returning to the vehicle, the operator may release the stanchion so that it will open and thereby release the animal.

From the foregoing description it will be apparent that the present invention provides a relatively simple animal catching device which may be in part supported on a motor vehicle and may be operated as an accessory to the motor vehicle in pursuing and catching a farm animal such as a cow. This apparatus materially simplifies the work of the farmers or rancher and eliminates the need for using horses in catching animals of the kind usually raised on farms and ranches.

Thus while a preferred embodiment of my invention has been illustrated herein, it is to be understood that changes and variations may be made by those skilled in the art without departing from the spirit and scope of the appending claims.

I claim:
1. In an animal catching device, a pen adapted to surround and enclose range animals such as cattle, sheep and the like while the animal remains in standing or running position on the ground and said pen having fence-like rear wall and side walls with the side walls pivoted on vertical axes at opposite ends of the rear wall for pivotal movement from open positions wherein the side walls diverge substantially with respect to each other to closed positions wherein the side and rear walls form a fully enclosed area in which an animal may be confined, means on said rear wall for pivotally supporting the rear wall on and across the forward end of an automotive vehicle, and means mounted in part on said pen and operable by a driver in such a vehicle for shifting said side wall between open and closed positions.

2. An animal catching device according to claim 1 wherein one of said side walls has a stanchion thereon including a movable stanchion bar, and means operable from such a vehicle for moving said stanchion bar.

3. An animal catching device according to claim 1 wherein a resilient member is connected between said side walls in parallel spaced relation to the rear wall for urging a penned animal forwardly as the vehicle advances.

References Cited in the file of this patent
UNITED STATES PATENTS

| | | |
|---|---|---|
| 1,298,996 | Milian | Apr. 1, 1919 |
| 1,557,709 | Leisse | Oct. 20, 1925 |
| 2,497,370 | Phillips | Feb. 14, 1950 |
| 2,729,196 | Breitenbach | Jan. 3, 1956 |
| 2,935,966 | Smith | May 10, 1960 |